(12) United States Patent  (10) Patent No.: US 7,975,835 B2
Pax  (45) Date of Patent: Jul. 12, 2011

(54) SHAKER CONVEYOR WITH ELLIPTICAL GEAR DRIVE SYSTEM

(75) Inventor: Steven J. Pax, Coldwater, OH (US)

(73) Assignee: Pax Products, Inc., Celina, OH (US)

( * ) Notice: Subject to any disclaimer, the term of this patent is extended or adjusted under 35 U.S.C. 154(b) by 50 days.

(21) Appl. No.: 12/590,647

(22) Filed: Nov. 12, 2009

(65) Prior Publication Data

US 2011/0108393 A1 May 12, 2011

(51) Int. Cl.
*B65G 25/04* (2006.01)
(52) U.S. Cl. .................... 198/750.1; 198/750.8
(58) Field of Classification Search .............. 198/750.1, 198/750.2, 750.8, 750.14, 774.3
See application file for complete search history.

(56) References Cited

U.S. PATENT DOCUMENTS

| | | | |
|---|---|---|---|
| 6,079,548 A * | 6/2000 | Svejkovsky et al. | 198/750.8 |
| 6,415,911 B1 * | 7/2002 | Svejkovksy et al. | 198/750.1 |
| 6,415,912 B1 | 7/2002 | Tamlin | |
| 6,490,941 B1 * | 12/2002 | Hur | 198/750.8 |
| 6,634,488 B2 | 10/2003 | Tamlin | |
| 7,216,757 B1 * | 5/2007 | Patterson et al. | 198/750.8 |
| 2001/0047925 A1 * | 12/2001 | Sullivan, Jr. | 198/750.8 |
| 2007/0017783 A1 | 1/2007 | Kwasniewiez | |
| 2008/0245639 A1 | 10/2008 | Kwasniewiez | |
| 2009/0229890 A1 * | 9/2009 | Sugioka et al. | 177/59 |

* cited by examiner

*Primary Examiner* — James R Bidwell
(74) *Attorney, Agent, or Firm* — Jacox, Meckstroth & Jenkins

(57) ABSTRACT

Scrap metal pieces are conveyed from a mechanical press by a shaker conveyor having horizontal and parallel spaced elongated trays supported for reciprocating linear movement above a compact drive unit attached to and supported by the press. The drive unit includes an electric motor having a shaft connected to rotate an elliptical input gear on an eccentric axis and in continuous mesh with an elliptical output gear eccentrically connected to an output shaft. A rocker arm and link assembly is eccentrically connected to the output shaft and oscillates in response to rotation of the output shaft. The assembly is pivotally connected to a support carriage for the trays for reciprocating the trays with rapid acceleration and rapid deceleration at one end of the linear stroke of the carriage and trays. The elliptical input and output gears are identical in size and have the same odd number of teeth.

17 Claims, 4 Drawing Sheets

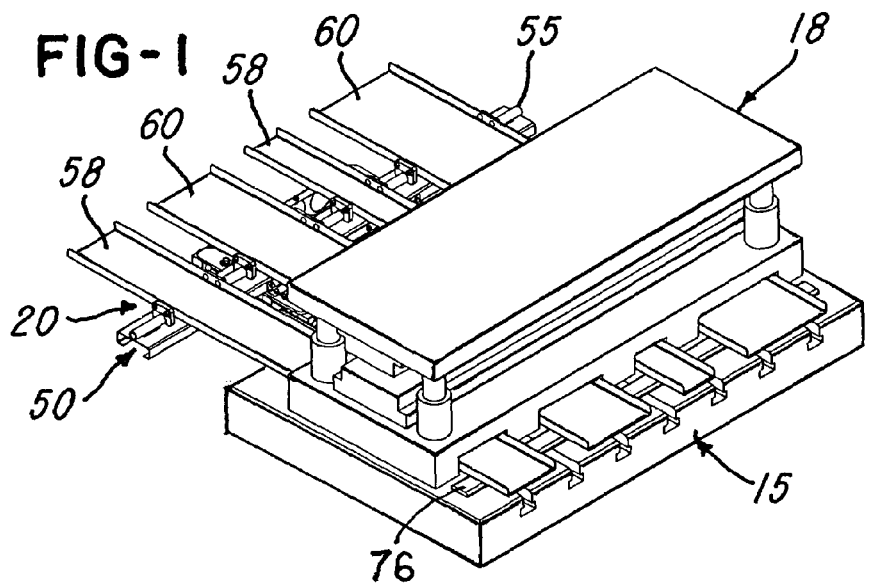
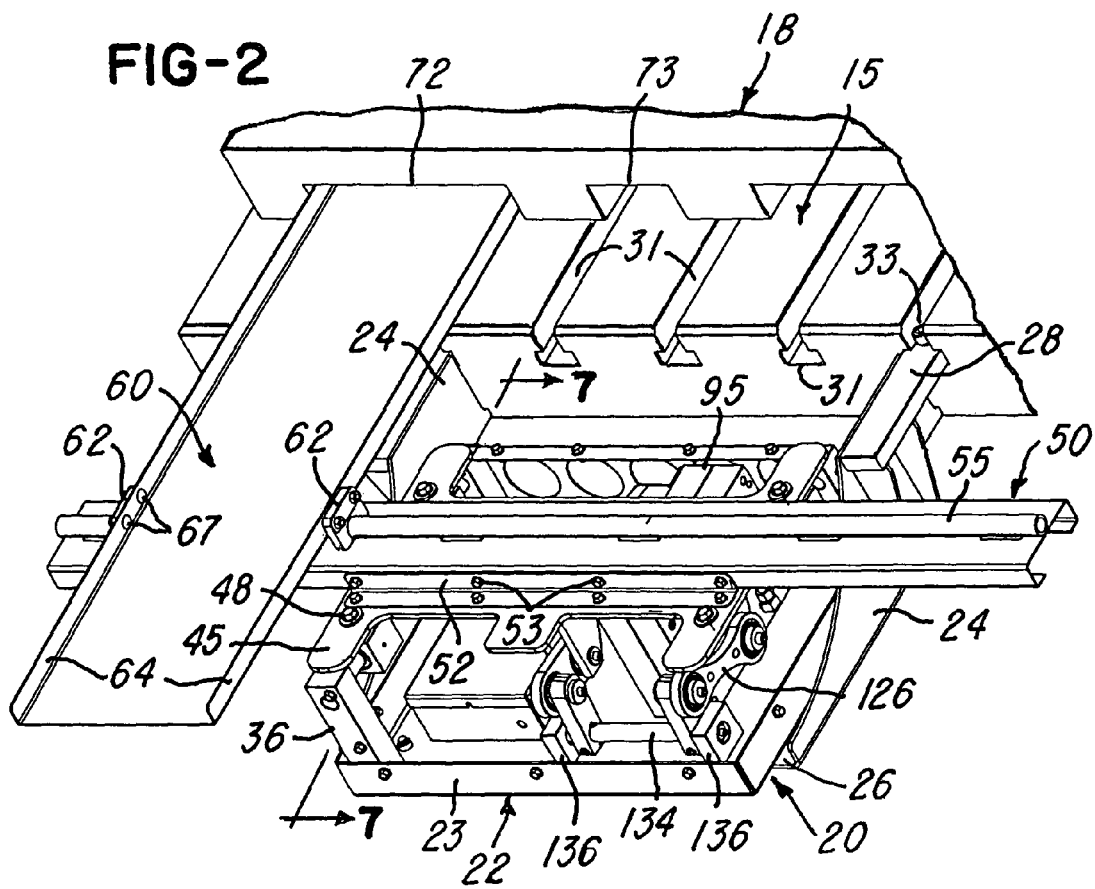

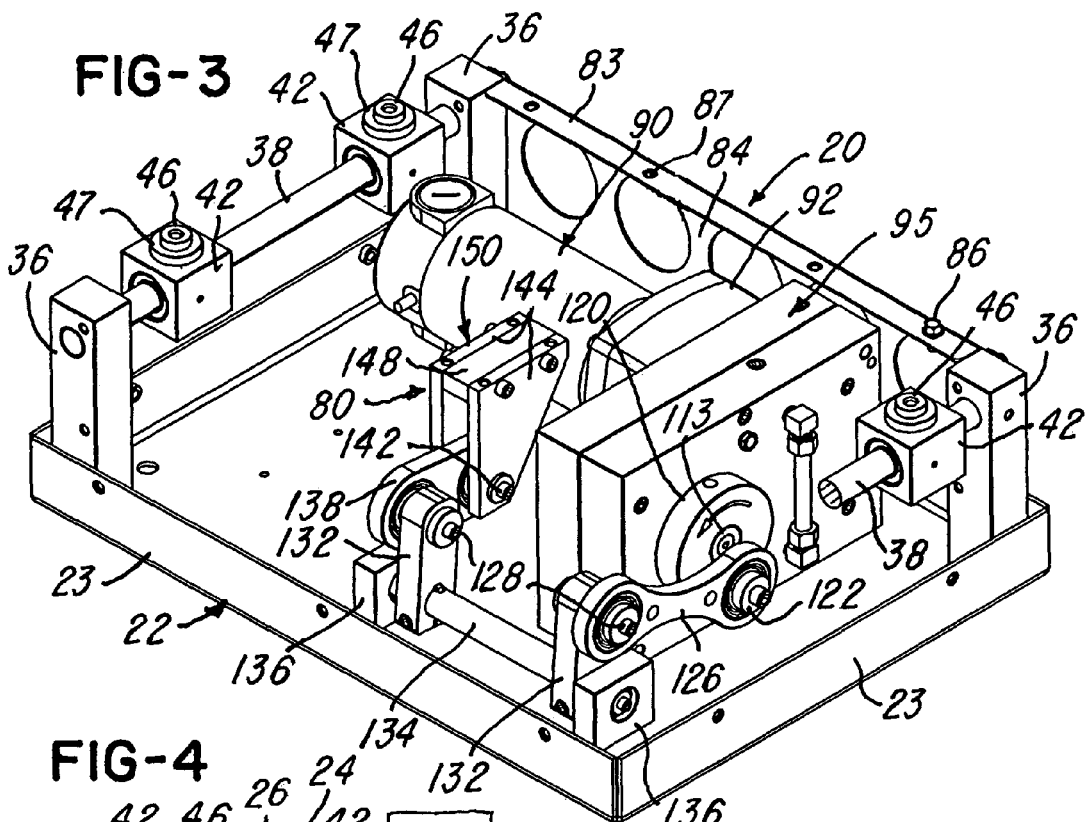
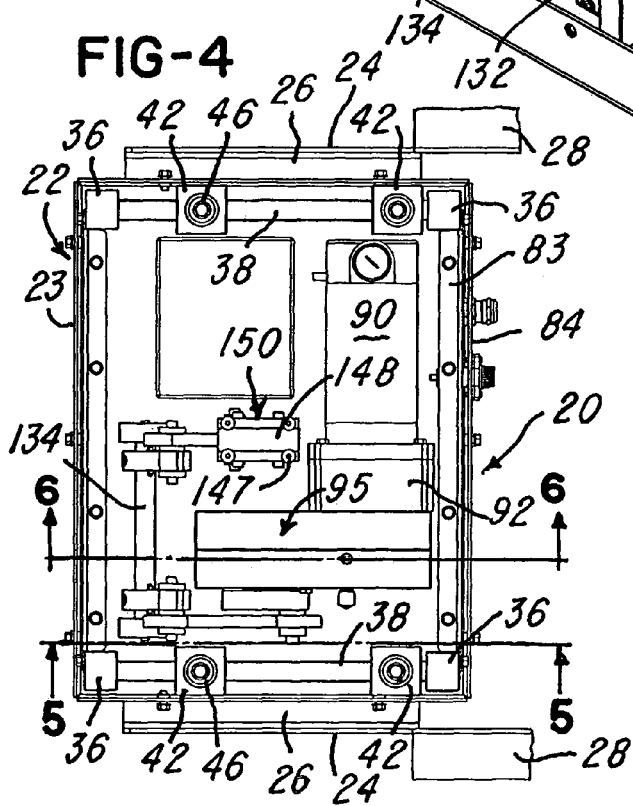

US 7,975,835 B2

SHAKER CONVEYOR WITH ELLIPTICAL GEAR DRIVE SYSTEM

BACKGROUND OF THE INVENTION

This invention relates to shaker conveyors of the type commonly used for transferring scrap pieces of metal from a mechanical press to a collection container and as disclosed, for example, in U.S. Pat. No. 6,415,912, U.S. Pat. No. 6,634,488 and in published patent applications No. 2007/0017783 and No. 2008/0245639. However, such shaker conveyors may also be progressively transferring other articles along a generally horizontal path. In such conveyors, one or more horizontal elongated trays are reciprocated at a frequency or speed and with a motion that the pieces or articles are progressively advanced along each tray. Shaker conveyors are commonly described as having a motion where the tray and the material to be conveyed move in one direction together and then the tray is rapidly moved in the opposite direction making the material slip relative to the tray. The slippage usually occurs after the tray has been reversed with the result that the material starts moving in the reverse direction before slipping.

It has been found that a shaker conveyor will operate better when the material or articles being conveyed begin to slide forward relative to the tray just before the end of the forward stroke. As a result, the material or articles continue to slide in the forward direction when the tray has reached the end of the stroke and is quickly accelerated in the opposite direction. When a shaker conveyor is used on a mechanical press, it is desirable for the conveyor to be a compact unit supported by the press and be easily attached and removed from the press for use on another press or for servicing. Also, when a plurality of parallel spaced trays are used on a press, it is desirable to apply the force which reciprocates the trays at a center location which is symmetrical with all of the trays. It is also desirable for multiple trays to be easily and conveniently removed and repositioned in parallel spaced relation to accommodate different progressive dies or tooling on a press or on different presses.

SUMMARY OF THE INVENTION

The present invention is directed to an improved shaker conveyor which provides all of the advantages mentioned above including a compact unit which quickly mounts on a mechanical press and encloses an electric motor drive unit which is dependable in operation and effectively reciprocates a plurality of parallel spaced shaker trays with a rapid acceleration and a rapid deceleration at one end of the reciprocating stroke of the trays in order to provide a smooth, continuous and efficient forward linear movement of the material on the trays. The opposite end of the stroke is very low in acceleration and deceleration.

In accordance with the illustrated embodiment of the shaker conveyor of the invention, a compact drive system or unit is adapted to be attached to the bolster plate of a mechanical press and is positioned below the top surface of the bolster plate to support a plurality of parallel spaced shaker trays which are adapted to extend horizontally into a progressive die mounted on the press. In general, the shaker conveyor of the invention includes at least one elongated tray supported for generally horizontal reciprocating movement and for receiving material such as scrap metal pieces produced by a mechanical press. A drive unit includes an electric motor connected to rotate an elliptical input gear on an axis eccentric to the axis of an input shaft, and the input gear continuously meshes with an elliptical output gear eccentrically connected to an output shaft. A rocker arm and link assembly is connected to the output shaft eccentrically of the axis of the output shaft to produce oscillation of the rocker arm and link assembly in response to rotation of the output shaft. The rocker arm and link assembly are connected to a carriage which supports the tray to reciprocate the tray and produce rapid acceleration and rapid deceleration at one end of the reciprocating stroke of the tray in order to produce smooth, continuous and efficient movement of the material on the tray.

Other features and advantages of the invention will be apparent from the following description, the accompanying drawings and the appended claims.

BRIEF DESCRIPTION OF THE DRAWINGS

FIG. 1 is a perspective view of a progressive die assembly mounted on the bolster of a mechanical press which supports a shaker conveyor constructed in accordance with the invention;

FIG. 2 is a larger perspective view of the shaker conveyor supporting one shaker tray and mounted on the bolster of the press shown in FIG. 1;

FIG. 3 is an enlarged perspective view of the shaker conveyor drive system shown in FIG. 2 and with portions removed to show internal construction;

FIG. 4 is a plan view of the drive system shown in FIG. 3;

DESCRIPTION OF THE ILLUSTRATED EMBODIMENT

Figure 5:
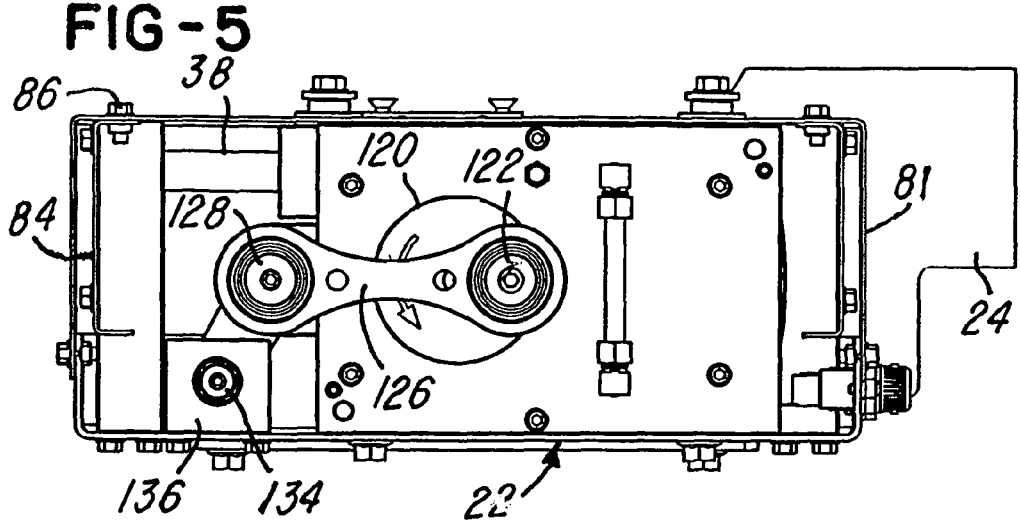
FIG. 5 is a section of the drive system, taken generally on the line 5-5 of FIG. 4.

FIG. 1 shows a bolster plate 15 of a conventional mechanical press and on which is mounted a progressive die 18. The bolster plate 15 also supports a shaker conveyor system or unit 20 constructed in accordance with the invention. The unit 20 includes a bottom pan-shaped rectangular base plate 22 (FIG. 2) having upwardly projecting boarder flanges 23. The base plate is supported on opposite ends by a pair of angle end brackets 24 (FIG. 2) having bottom flanges 26 projecting under the base plate 22 and secured to the base plate. The upper edge portions of the end brackets 24 are secured to straight flat bars 28 which project into corresponding T-slots 31 in the bolster plate 15, and each bar 28 is secured to the plate 15 by a pair of jack screws 33 which force the bar upwardly against the undercut surfaces of the T-slot. This attachment provides for quickly attaching and removing the unit 20 to the press.

Figure 7:
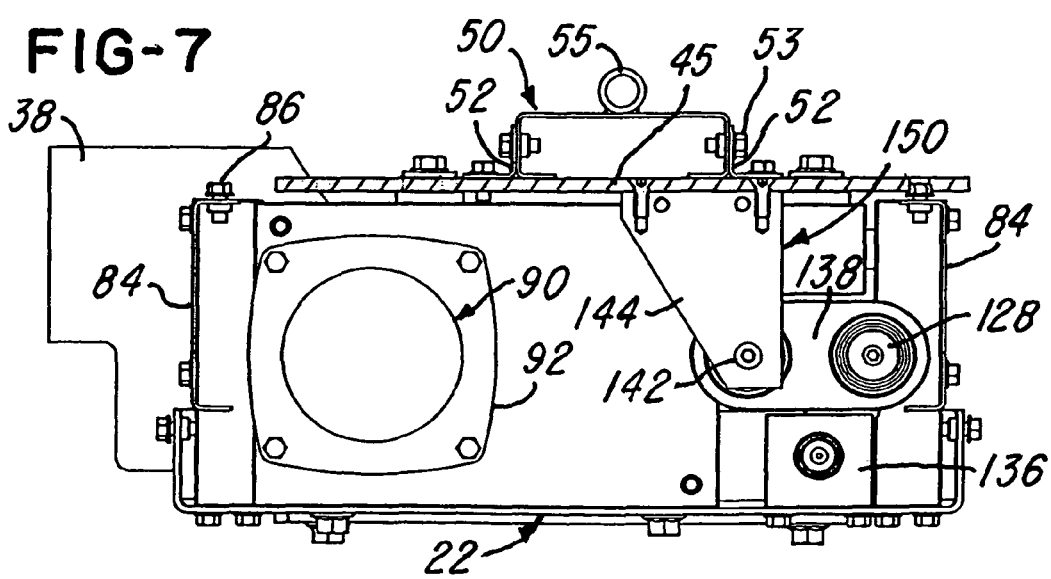
FIG. 7 is a section of the drive system, taken generally on the line 7-7 of FIG. 2.

The shaker conveyor system or unit 20 has a set of four corner posts or supports 36 (FIG. 4), and each pair of supports 36 support opposite end portions of a smooth or polished cylindrical linear rod or rail 38. A pair of linear bearings enclosed within housings 42 are mounted on each rail 38, and a flat top plate 45 (FIG. 2) is secured to annular shoulders 47 (FIG. 3) on the bearing housings 42 by a set of washers and screws 48 (FIG. 2) threaded into bosses 46 projecting through holes within the plate 45 so that the top plate 45 is supported by the rails for smooth linear movement toward and away from the bolster plate 15. An elongated cross arm carriage 50 (FIG. 2), in the form of an inverted channel, is secured to the top plate 45 by a pair of right angle strips 52 (FIG. 7) and a set of machine screws or bolts 53. An elongated shaker shaft 55, in the form of a cylindrical tube, is welded to the top surface of the channel and forms a part of the cross arm carriage 50. Thus the carriage 50 is supported by the rails 38 for lateral reciprocating movement relative to the bolster plate 15.

As shown in FIGS. 1 and 2, at least one and usually a plurality or set of elongated flat shaker trays 58 and 60 are each secured to the carriage 50 by a pair of inverted U-shaped saddles 62 mounted on upwardly projecting side flanges 64 of each tray 60 by a set of screws 67. The saddles 62 fit snugly on the shaft 55 without clearance so that there is no relative movement between each tray 60 and the carriage 50. The elongated shaker trays 58 and 60 project slightly above the top surface of the bolster plate 15 and through corresponding open bottom slots 72 and 73 within the bottom plate of the progressive die 18. As shown in FIG. 1, a thin plastic strip 76 is attached to the top surface of the bolster plate 15 and supports projecting end portions of the shaker trays 58 and 60 to avoid wear on the bolster plate and on the shaker trays.

The cross arm carriage 50 and the shaker trays 58 and 60 are reciprocated by a drive assembly or unit 80 (FIG. 3) which is supported by the base plate 22 and is enclosed by a formed sheet metal cover 81 (FIG. 5). The cover 81 is secured to top flanges 83 (FIG. 3) on inner and outer channel-shape brackets 84 (FIG. 5) by a set of sheet metal screws 86 (FIGS. 3 & 5) extending through holes 87 within the top flanges of the inner and outer brackets 84. The brackets 84 are secured to the corner supports 36, and the cover 81 is also secured to the flanges 23 (FIG. 5) of the bottom plate 22. Thus the cover encloses the drive unit 80 except for slots which permit reciprocating movement of the top plate 45 and carriage 50.

Figure 6:
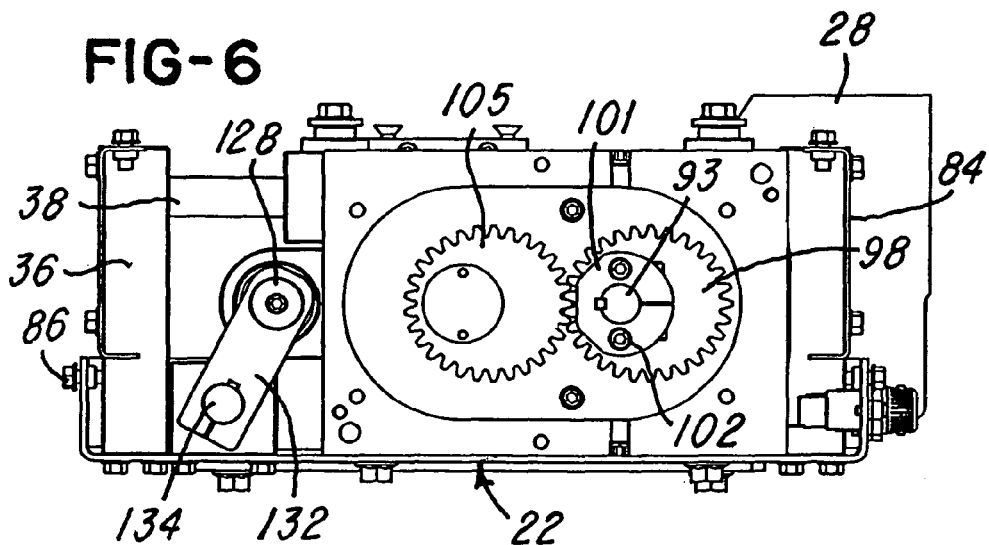
FIG. 6 is a section of the drive system, taken generally on the line 6-6 of FIG. 4.
Figure 8:
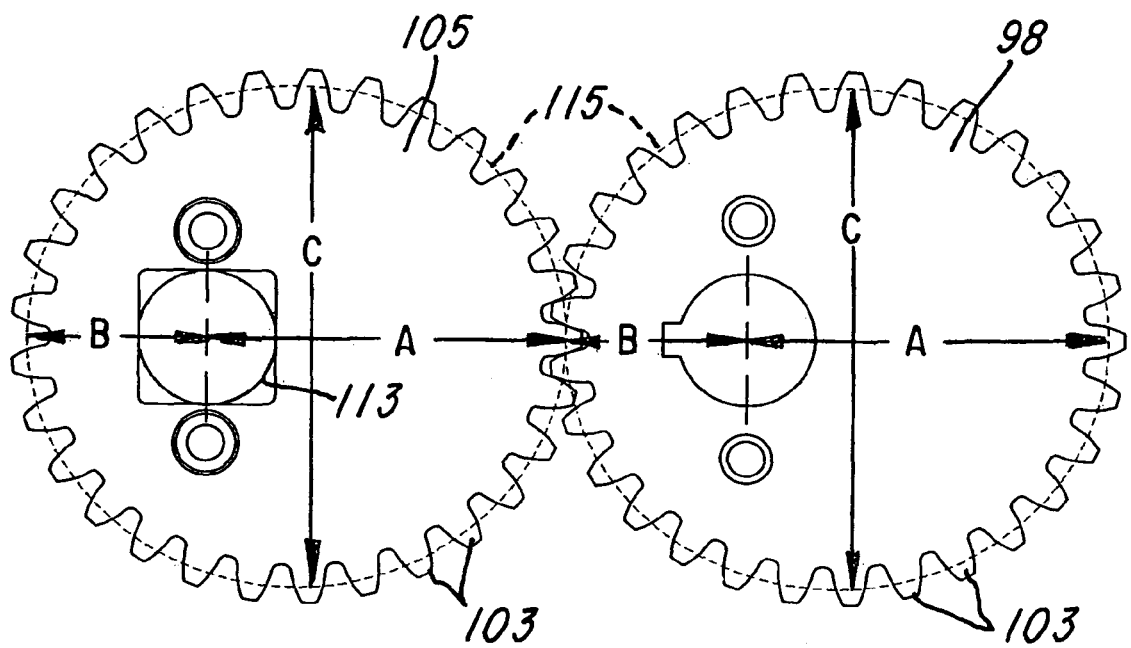
FIG. 8 is an elevation view of the eccentrically supported elliptical input and output gears used in the drive system.

Referring to FIGS. 3 and 4, the drive unit 80 includes an electric motor 90 having an output shaft projecting into a reducer gearbox 92 coupled to the motor and having an output shaft 93 (FIG. 6) projecting into a two-section gearbox 95. An elliptical input gear 98 (FIG. 6) is eccentrically mounted on the shaft 93 and is secured to the shaft by a keyed split clamp 101 attached to the gear 98 by a pair of machine screws 102. The elliptical input gear 98 has peripheral teeth 103 (FIG. 8) which mash with corresponding teeth 103 on an elliptical output gear 105 which has an outer portion substantially identical to the elliptical input gear 98. The output gear 105 is eccentrically mounted on a square hub of an output shaft 113 supported for rotation by bearings within the gearbox 95. Preferably, the outer portions of the elliptical input gear 98 and the elliptical output gear 105 have the same odd number of teeth, for example, each having 29 teeth. FIG. 8 shows an example of the continuously meshing elliptical input gear 98 and output gear 105. The gears have elliptical pitch circles 115, and in a plane passing through the axes of rotation of both gears shows that the axes are located a distance A of about two inches from the pitch circle 115 and a distance B of about one inch from the pitch circle. The diameter C of the pitch circle 115 in both gears and a perpendicular plane is less then three inches, or about 2.828 inches.

Referring again to FIG. 3, a cylindrical hub 120 is mounted on a projecting end portion of the output shaft 113 and supports an eccentric stub shaft 122 connected by a link member or arm 126 to a stub shaft 128 projecting from one end portion of a rocker arm 132 having an opposite end portion clamped to a rotary shaft 134. Opposite end portions of the shaft 134 are rotatably supported by bearings mounted within bearing blocks 136 secured to the base plate 22. The opposite end portion of the shaft 134 supports a second rocker arm 132 which carries another stub shaft 128 connected by a bearing to another link arm 138. The opposite end portion of the link arm 138 is pivotally connected to a shaft 142 having opposite end portions secured to parallel spaced vertical plates 144. The plates 144 are secured by screws (FIG. 4) to a base plate 148.

Figure 9:
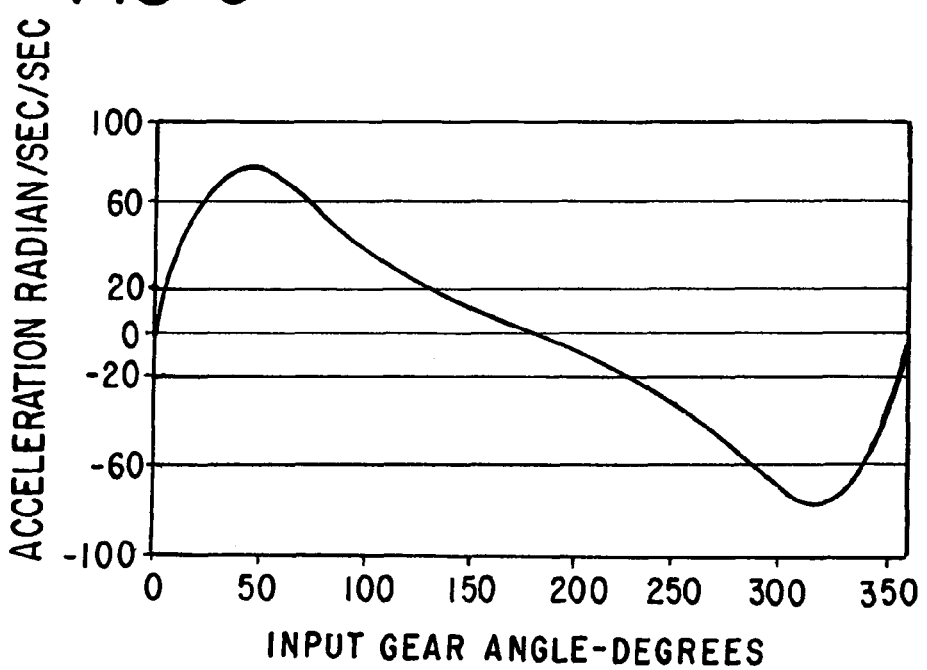
FIG. 9 is a diagram showing the rapid acceleration and deceleration of the shaker tray at one end of the stroke of reciprocation.

The side plates 144 and base plate 148 form a clevis 150 (FIGS. 4 & 7) which is secured to the top plate 45 by four screws extending through a center portion of the top plate 45. The opposite end portions of the link arms 126 and 138 support antifriction bearings which receive the corresponding stub shafts so that the connection of the link arms and rocker arms and the support of the rocker arms by the shaft 134 provide a form of oscillating rocker arm and link assembly. This assembly is effective to reciprocate the clevis 150, top plate 45, cross arm carriage 50 and attached trays 58 and 60 in response to rotation of the hub 120 driven by the motor 90 through the matched elliptical input and output gears 98 & 105. As a result, the reciprocating movement of the cross arm carriage 50 and attached shaker trays 58 and 60 have a reciprocating movement as shown by the diagram of FIG. 9 so that the carriage 50 and trays have rapid acceleration and rapid deceleration at one end of the reciprocating stroke of the trays or at 0° and 360° of rotation of the input gear 98. The opposite end of the stroke has very low acceleration and deceleration which occurs at 180° of rotation of the input gear. This movement of the trays produces a smooth, continuous and efficient movement of the material being transferred by the trays.

As also apparent from the drawings and the above description, the shaker conveyor unit 20 is self-contained and is easily installed on a mechanical press and quickly removed so that the unit may be transferred from press to press or removed for set-up or maintenance when required. As mentioned above, by varying the rotational speed of the output shaft 113 with the eccentrically mounted elliptical gears 98 and 105, the optimum reciprocating movement of the cross arm carriage 50 and shaker trays is obtained. It is also within the scope of the invention to use a variable speed electric motor in place of the single speed motor 90 if fine tuning of the reciprocating movement is required according to the parts or articles being transferred by the shaker conveyor unit. The shaker conveyor drive unit 80 is also compact and enclosed within the base plate 22. The drive system or unit further provides for reciprocating the top plate 45 and cross arm carriage 50 at the center of the carriage and midway between the carriage support rods 38. This feature provides for balanced loading between the bearing housings 42 when the shaker trays are located at any place along the carriage 50. The simple attachment of each tray to the carriage 50 by means of the saddles 62 also contributes to reducing the set up time and set up cost.

While the form of shaker conveyor herein described constitutes a preferred embodiment of the invention, it is to be understood that the invention is not limited to this precise form of shaker conveyor, and that changes made therein without departing from the scope and spirit of the invention as defined in the appended claims.

What is claimed is:
1. A shaker conveyor adapted to be mounted on a mechanical press for progressively transferring material such as scrap metal pieces from the press, said conveyor comprising
   at least one elongated tray supported for generally horizontal reciprocating movement and adapted to receive the material, a drive unit including an electric motor having a motor shaft connected to rotate an input shaft supporting an elliptical input gear having an axis eccentric to an axis of said input shaft, said input gear in continuous mesh with an elliptical output gear eccentrically connected to an output shaft, a rocker arm and link assembly connected to said output shaft eccentrically of an axis of said output shaft to produce oscillation of said rocker arm and said link assembly in response to rotation of said output shaft, and said rocker arm and link assembly connected to said tray to reciprocate said tray and produce rapid acceleration and rapid deceleration at one end of a reciprocating stroke of said tray to effect smooth, continuous and efficient movement of the material on said tray.

2. A conveyor as defined in claim 1 wherein said input gear and said output gear have the same elliptical pitch circle.

3. A conveyor as defined in claim 2 wherein said input gear and said output gear have the same number of teeth.

4. A conveyor as defined in claim 1 and including a horizontal plate supported by parallel spaced linear bearing and shaft units for horizontal reciprocating movement, an elongated carriage mounted on said plate, and said rocker arm and link assembly is pivotally connected to center portions of said plate and said carriage.

5. A conveyor as defined in claim 4 and including an elongated shaker shaft secured to said carriage, and said tray includes a set of inverted U-shape saddle brackets releasably attached to said shaker shaft.

6. A conveyor as defined in claim 4 wherein said carriage projects substantially beyond said horizontal plate, and said plate is disposed below a center portion of said carriage.

7. A conveyor as defined in claim 4 and including a horizontal base plate supporting said drive unit and said linear bearing and shaft units, a pair of parallel spaced support brackets supporting said base plate and including parallel spaced bars adapted to project into inverted T-slots within a bolster plate for the press to support said shaker conveyor.

8. A conveyor as defined in claim 1 wherein said rocker arm and link assembly includes a first link member eccentrically connected to said output shaft and pivotally connected to a first rocker arm secured to a rotatably supported shaft, a second rocker arm secured to said rotatably supported shaft and pivotally connected to second link member, and said second link member is pivotally connected to a reciprocating carriage supporting said tray.

9. A conveyor as defined in claim 1 wherein said electric motor is coupled to a reducing gearbox having an output shaft forming said input shaft supporting said elliptical input gear.

10. A shaker conveyor adapted to be mounted on a mechanical press for progressively transferring material such as scrap metal pieces from the press, said conveyor comprising a series of parallel spaced elongated trays supported for generally horizontal reciprocating movement and adapted to receive the material, a drive unit including an electric motor having a motor shaft connected to rotate an input shaft supporting an elliptical input gear having an axis eccentric to an axis of said input shaft, said input gear in continuous mesh with an elliptical output gear eccentrically connected to an output shaft, a rocker arm and link assembly connected to said output shaft eccentrically of an axis of said output shaft to produce oscillation of said rocker arm and said link assembly in response to rotation of said output shaft, and said rocker arm and link assembly connected to an elongated carriage supporting said trays to reciprocate said trays and produce rapid acceleration and rapid deceleration at one end of a reciprocating stroke of said trays to effect smooth, continuous and efficient movement of the material on said trays.

11. A conveyor as defined in claim 10 wherein said input gear and said output gear have the same elliptical pitch circle and have the same number of teeth.

12. A conveyor as defined in claim 10 and including a horizontal plate supported by parallel spaced linear bearing and shaft units for horizontal reciprocating movement, said elongated carriage mounted on said plate, and said rocker arm and link assembly is pivotally connected to center portions of said plate and said carriage.

13. A conveyor as defined in claim 12 and including an elongated shaker shaft secured to said carriage, and said trays each includes a set of inverted U-shape saddle brackets releasably attached to said shaker shaft.

14. A conveyor as defined in claim 12 wherein said carriage projects substantially beyond said horizontal plate, and said plate is disposed below a center portion of said carriage.

15. A conveyor as defined in claim 12 and including a horizontal base plate supporting said drive unit and said linear bearing and shaft units, a pair of parallel spaced support brackets supporting said base plate and including parallel spaced bars adapted to project into inverted T-slots within a bolster plate for the press to support said shaker conveyor.

16. A conveyor as defined in claim 10 wherein said rocker arm and link assembly includes a first link member eccentrically connected to said output shaft and pivotally connected to a first rocker arm secured to a rotatably supported shaft, a second rocker arm secured to said rotatably supported shaft and pivotally connected to second link member, and said second link member is pivotally connected to said carriage supporting said trays.

17. A conveyor as defined in claim 10 wherein said electric motor is coupled to a reducing gearbox having an output shaft forming said input shaft supporting said elliptical input gear.

* * * * *